(12) United States Patent
Sarda et al.

(10) Patent No.: US 12,081,587 B2
(45) Date of Patent: Sep. 3, 2024

(54) SYSTEM AND METHOD FOR DNS-BASED NETWORK CHAOS INJECTION

(71) Applicant: JPMorgan Chase Bank, N.A., New York, NY (US)

(72) Inventors: Deepak Sarda, Singapore (SG); Yohei Kusakabe, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 359 days.

(21) Appl. No.: 17/644,172

(22) Filed: Dec. 14, 2021

(65) Prior Publication Data

US 2022/0224718 A1 Jul. 14, 2022

Related U.S. Application Data

(60) Provisional application No. 63/135,172, filed on Jan. 8, 2021.

(51) Int. Cl.
*H04L 9/40* (2022.01)
*H04L 61/4511* (2022.01)

(52) U.S. Cl.
CPC ...... *H04L 63/1466* (2013.01); *H04L 61/4511* (2022.05); *H04L 63/0281* (2013.01)

(58) Field of Classification Search
None
See application file for complete search history.

(56) References Cited

U.S. PATENT DOCUMENTS

2022/0100599 A1\* 3/2022 Abuelela ............. H04L 41/5019
2022/0100645 A1\* 3/2022 Paterson-Jones ....... G06F 9/541

\* cited by examiner

*Primary Examiner* — William J. Goodchild
(74) *Attorney, Agent, or Firm* — GREENBLUM & BERNSTEIN, P.L.C.

(57) ABSTRACT

A system and method for injecting network chaos between a client system and a server system within a network are disclosed. A processor implement a chaos controller DNS (Domain Name System) server and configures a client application running on the client system to utilize the chaos controller DNS server as a DNS server. The processor also selects the chaos controller DNS as the DNS server and implements a chaos controller application programming interface (API) and a chaos controller central server; and orchestrates a type and a duration of a network chaos injection by utilizing the chaos controller API and the chaos controller central server without modifying an application code of the client application.

14 Claims, 6 Drawing Sheets

SYSTEM AND METHOD FOR DNS-BASED NETWORK CHAOS INJECTION

CROSS-REFERENCE TO RELATED APPLICATIONS

This application claims the benefit of priority from U.S. Provisional Patent Application No. 63/135,172, filed Jan. 8, 2021, which is herein incorporated by reference in its entirety.

TECHNICAL FIELD

This disclosure generally relates to chaos injection, and, more particularly, to methods and apparatuses for implementing a chaos injection module that utilizes DNS (Domain Name System) to intercept network requests and inject failures.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Chaos injection may involve deliberate injection of failures in order to understand how a system would respond to such failures when they really happen. Real world failures may come in different shapes and sizes, and therefore, chaos engineering may also require injecting failures of different types.

In particular, there are a class of failures related to network communications between systems. To understand the behavior of systems in the presence of network communication failures, chaos injection typically calls for deliberately injecting network failures between two communicating systems. To inject failure at the network communication level, the first step may be to intercept the network traffic. Once intercepted, the interceptor can manipulate the traffic and inject the desired network failures.

Today, different approaches may be utilized for intercepting network traffic: (i) intercept communications within an application; and (ii) intercept communications at the host level. The first approach (i) may depend on adding a custom library to the application that intercepts all outbound network calls and injects desired failures. However, the first approach (i) often prove to be intrusive and not all programming languages have such libraries readily available. On the other hand, the second approach (ii) may depend on using privileged capabilities provided by the host operating system to intercept all network traffic originating from the application. However, the second approach (ii) may require privileged capabilities (like "root") which may not be readily available in many operating environments. Thus, both of these approaches have limitations that one would like to avoid.

SUMMARY

The present disclosure, through one or more of its various aspects, embodiments, and/or specific features or sub-components, provides, among other features, various systems, servers, devices, methods, media, programs, and platforms for implementing a DNS-based network chaos injection module that utilizes DNS to intercept network requests and inject failures, thereby obviating the necessity to modify application code or special privileges on a host operating system, but the disclosure is not limited thereto.

According to an aspect of the present disclosure, a method for injecting network chaos between a client system and a server system within a network by utilizing one or more processors and one or more memories is disclosed. The method may include: implementing a chaos controller DNS (Domain Name System) server; configuring a client application running on the client system to utilize the chaos controller DNS server as a DNS server; selecting the chaos controller DNS as the DNS server; implementing a chaos controller application programming interface (API) and a chaos controller central server; and orchestrating a type and a duration of a network chaos injection by utilizing the chaos controller API and the chaos controller central server without modifying an application code of the client application.

According to another aspect of the present disclosure, the chaos controller DNS server may be configured to change DNS response based on a command from the chaos controller central server, but the disclosure is not limited thereto.

According to a further aspect of the present disclosure, the method may further include implementing a chaos proxy which is a network proxy where the network chaos injection happens.

According to yet another aspect of the present disclosure, the chaos controller DNS server may be configured to operate in a normal operation mode and a chaos injection mode different from the normal operation mode, but the disclosure is not limited thereto.

According to another aspect of the present disclosure, during the normal operation mode when the client system needs to communicate with a target server, the method may further include: executing the chaos controller DNS server, wherein during the normal operation mode, the chaos controller DNS server may be configured to: implement a default DNS server from within the network to return an internet protocol (IP) address of the target server; and establish a direct connection between the client system and the target server without any network interception.

According to a further aspect of the present disclosure, during the chaos injection mode when the client system needs to communicate with a target server, the method may further include: coordinating the chaos controller API and the chaos controller central server to execute the chaos controller DNS server to operate in the chaos injection mode, wherein during the chaos injection mode, the chaos controller DNS server is configured to: return an IP address of an intercepting chaos proxy server instead of an IP address of the target server; and establish a direct connection between the client system and the intercepting chaos proxy server; and inject network failures of various types via the intercepting chaos proxy server.

According to yet another aspect of the present disclosure, a system for injecting network chaos between a client system and a server system within a network is disclosed. The system may include: a processor and one or more memories operatively connected to the processor via the network, wherein the processor may be configured to: implement a chaos controller DNS (Domain Name System) server; configure a client application running on the client system to utilize the chaos controller DNS server as a DNS server; select the chaos controller DNS as the DNS server; provide a chaos controller application programming interface (API) and a chaos controller central server; and orchestrate a type and a duration of a network chaos injection by utilizing the chaos controller API and the chaos controller central server without modifying an application code of the client application.

According to a further aspect of the present disclosure, the processor may be further configured to implement a chaos proxy which is a network proxy where the network chaos injection happens.

According to another aspect of the present disclosure, during the normal operation mode when the client system needs to communicate with a target server, the processor may be further configured to: execute the chaos controller DNS server, and wherein during the normal operation mode, the chaos controller DNS server may be configured to: implement a default DNS server from within the network to return an internet protocol (IP) address of the target server; and establish a direct connection between the client system and the target server without any network interception.

According to a further aspect of the present disclosure, during the chaos injection mode when the client system needs to communicate with a target server, the processor may be further configured to: coordinate the chaos controller API and the chaos controller central server to execute the chaos controller DNS server to operate in the chaos injection mode.

According to an additional aspect of the present disclosure, during the chaos injection mode, the chaos controller DNS server is configured to: return an IP address of an intercepting chaos proxy server instead of an IP address of the target server; and establish a direct connection between the client system and the intercepting chaos proxy server; and inject network failures of various types via the intercepting chaos proxy server.

According to a further aspect of the present disclosure, a non-transitory computer readable medium configured to store instructions for injecting network chaos between a client system and a server system within a network is disclosed. The instructions, when executed, may cause a processor to perform the following: implementing a chaos controller DNS (Domain Name System) server; configuring a client application running on the client system to utilize the chaos controller DNS server as a DNS server; selecting the chaos controller DNS as the DNS server; implementing a chaos controller application programming interface (API) and a chaos controller central server; and orchestrating a type and a duration of a network chaos injection by utilizing the chaos controller API and the chaos controller central server without modifying an application code of the client application.

According to a further aspect of the present disclosure, the instructions, when executed, may further cause the processor to perform the following: implementing a chaos proxy which is a network proxy where the network chaos injection happens.

According to another aspect of the present disclosure, during the normal operation mode when the client system needs to communicate with a target server, the instructions, when executed, may further cause the processor to perform the following: executing the chaos controller DNS server, and wherein during the normal operation mode, the chaos controller DNS server may be configured to: implement a default DNS server from within the network to return an internet protocol (IP) address of the target server; and establish a direct connection between the client system and the target server without any network interception.

According to a further aspect of the present disclosure, during the chaos injection mode when the client system needs to communicate with a target server, the instructions, when executed, may further cause the processor to perform the following: coordinating the chaos controller API and the chaos controller central server to execute the chaos controller DNS server to operate in the chaos injection mode, and wherein during the chaos injection mode, the chaos controller DNS server is configured to: return an IP address of an intercepting chaos proxy server instead of an IP address of the target server; and establish a direct connection between the client system and the intercepting chaos proxy server; and inject network failures of various types via the intercepting chaos proxy server.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
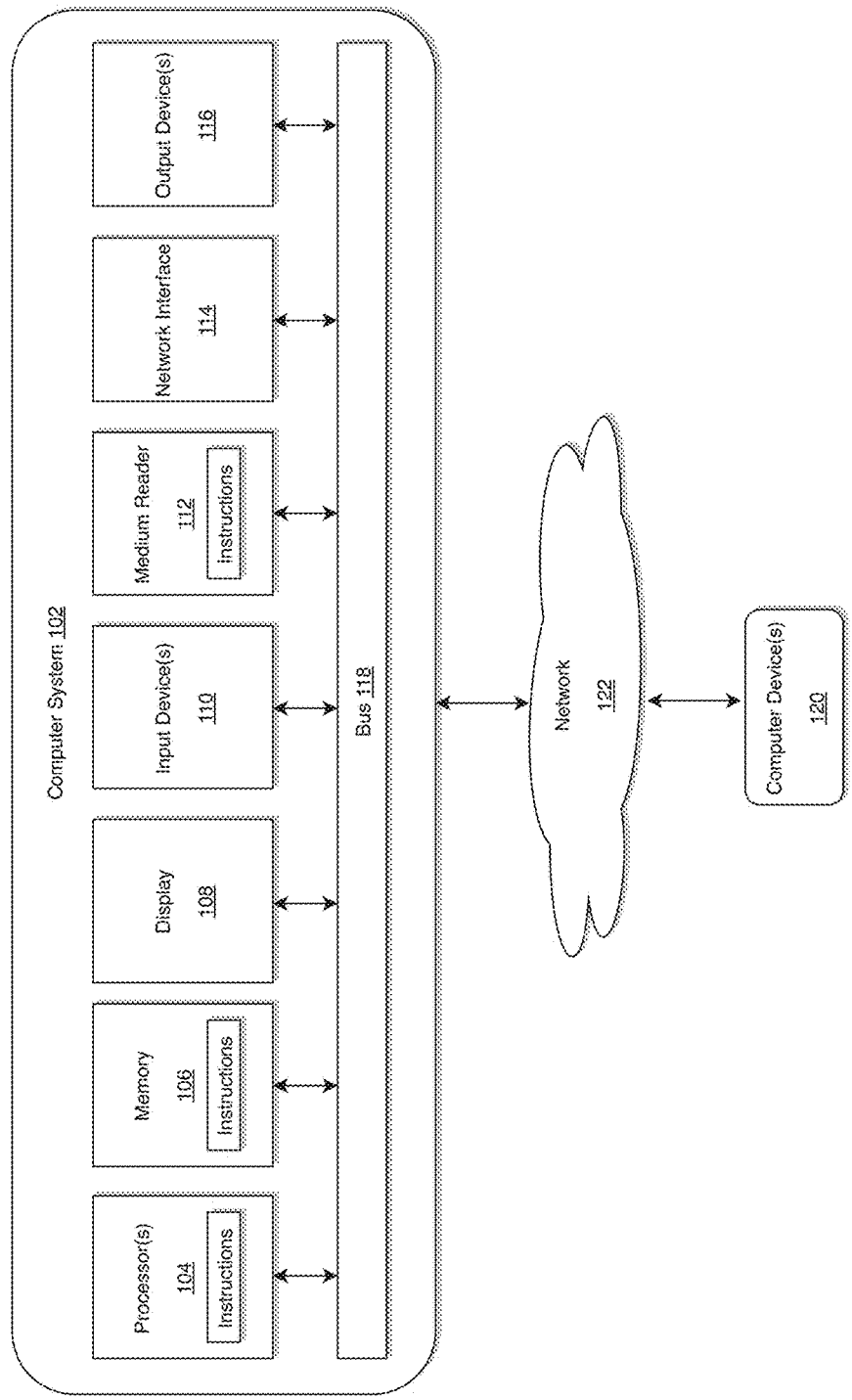
FIG. 1 illustrates a computer system for implementing a DNS-based network chaos injection module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for implementing a chaos injection module that utilizes DNS to intercept network requests and inject failures in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
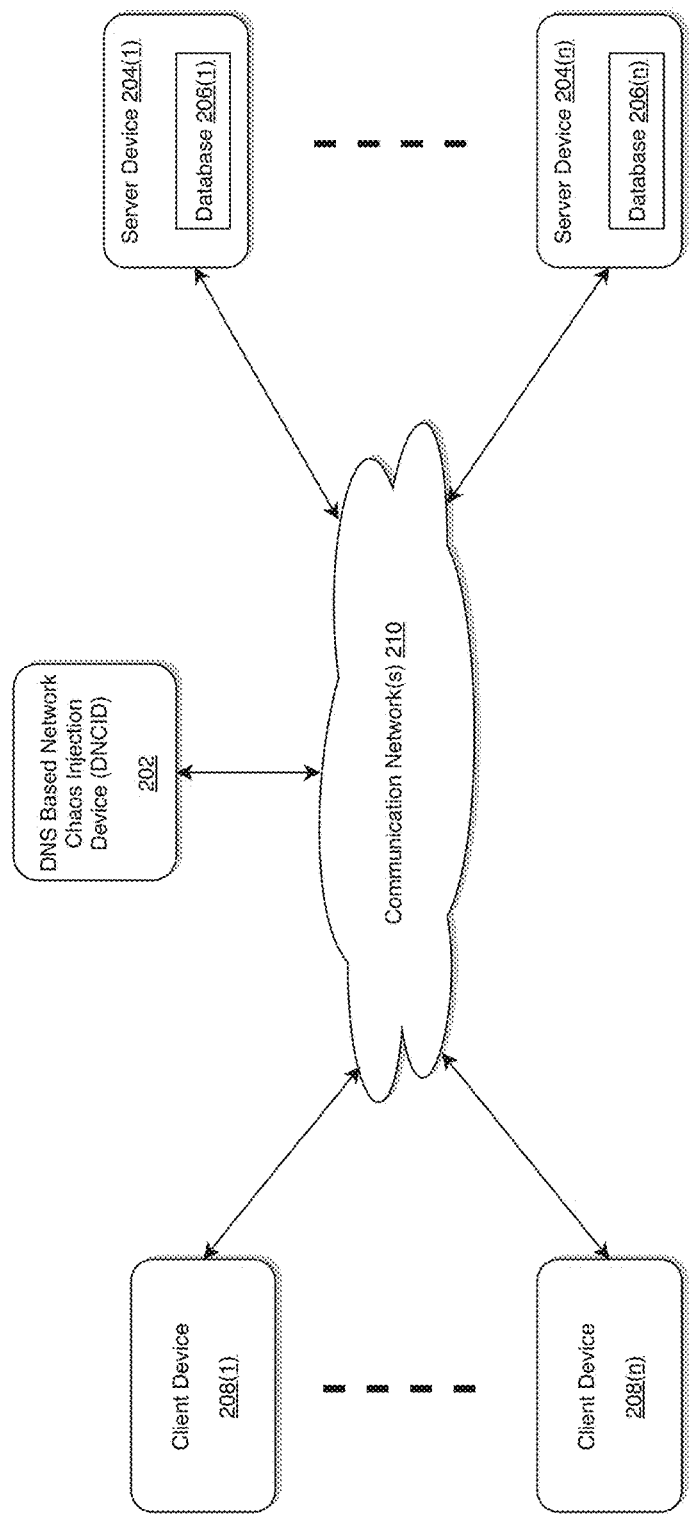
FIG. 2 illustrates an exemplary diagram of a network environment with a chaos injection device in accordance with an exemplary embodiment.

Referring to FIG. 2, a schematic of an exemplary network environment 200 for implementing a DNS-based network chaos injection device (DNCID) of the instant disclosure is illustrated.

According to exemplary embodiments, the above-described problems associated with conventional approach of chaos injection may be overcome by implementing a DNCID 202 as illustrated in FIG. 2 that may provide a platform for implementing a DNS-based network chaos injection module that utilizes DNS to intercept network requests and inject failures, thereby obviating the necessity to modify application code or special privileges on a host operating system, but the disclosure is not limited thereto.

The DNCID 202 may be the same or similar to the computer system 102 as described with respect to FIG. 1.

The DNCID 202 may store one or more applications that can include executable instructions that, when executed by the DNCID 202, cause the DNCID 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DNCID 202 itself, may be located in virtual server(s) running in a cloud-based computing environment rather than being tied to one or more specific physical network computing devices. Also, the application(s) may be running in one or more virtual machines (VMs) executing on the DNCID 202. Additionally, in one or more embodiments of this technology, virtual machine(s) running on the DNCID 202 may be managed or supervised by a hypervisor.

In the network environment 200 of FIG. 2, the DNCID 202 is coupled to a plurality of server devices 204(1)-204(n) that hosts a plurality of databases 206(1)-206(n) including adaptive data storages, and also to a plurality of client devices 208(1)-208(n) via communication network(s) 210. A communication interface of the DNCID 202, such as the network interface 114 of the computer system 102 of FIG. 1, operatively couples and communicates between the DNCID 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DNCID 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DNCID 202 may be a standalone device or integrated with one or more other devices or apparatuses, such as one or more of the server devices 204(1)-204(n), for example. In one particular example, the DNCID 202 may be hosted by one of the server devices 204(1)-204(n), and other arrangements are also possible. Moreover, one or more of the devices of the DNCID 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DNCID 202 via the communication network(s) 210 according to the HTTP-based, HTTPS-based, and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DNCID 202 that may efficiently provide a platform for implementing the DNCID 202 which may be configured to automatically handle and process a vast amount of data in a quick and expedited manner and manage quality of data received, thereby significantly increasing data processing speed and significantly reducing lapse time that may be necessary to manage data quality of data that is flowing between a plurality of computing devices, but the disclosure is not limited thereto.

The client devices 208(1)-208(n) may run interface applications, such as standard web browsers or standalone client applications, which may provide an interface to communicate with the DNCID 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DNCID 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DNCID 202, the server devices 204(1)-204(n), or the client devices 208(1)-208(n), for example, may be configured to operate as virtual instances on the same physical machine. For example, one or more of the DNCID 202, the server devices 204(1)-204(n), or the client devices 208(1)-208(n) may operate on the same physical device rather than as separate devices communicating through communication network(s) 210. Additionally, there may be more or fewer DNCIDs 202, server devices 204(1)-204(n), or client devices 208(1)-208(n) than illustrated in FIG. 2. According to exemplary embodiments, the DNCID 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
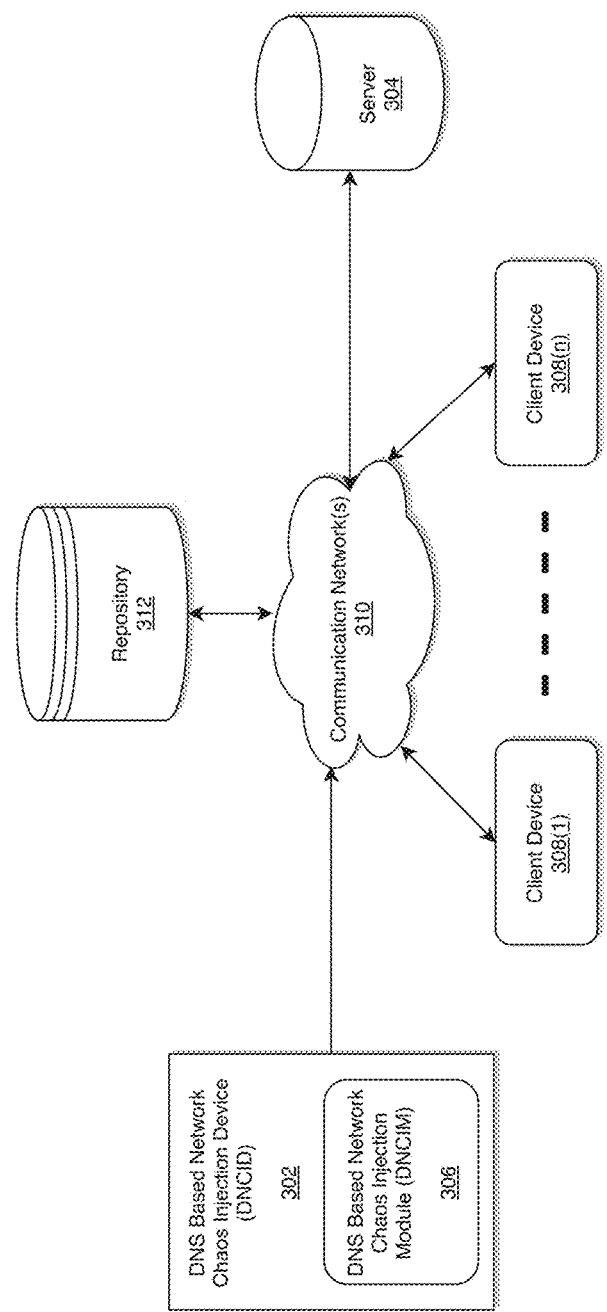
FIG. 3 illustrates a system diagram for implementing a chaos injection device having a chaos injection module in accordance with an exemplary embodiment.

FIG. 3 illustrates a system diagram 300 for implementing a DNCID having a DNS-based network chaos injection module (DNCIM) in accordance with an exemplary embodiment.

As illustrated in FIG. 3, the DNCID 302 including the DNCIM 306 may be connected to a server 304, and a repository 312 including one or more memories via a communication network 310. The DNCID 302 may also be connected to a plurality of client devices 308(1)-308(n) via the communication network 310, but the disclosure is not limited thereto.

According to exemplary embodiment, the DNCID 302 is described and shown in FIG. 3 as including the DNCIM 306, although it may include other rules, policies, modules, databases, or applications, for example. According to exemplary embodiments, the repository 312 may be embedded within the DNCID 302. Although only one repository 312 is illustrated in FIG. 3, according to exemplary embodiments, a plurality of repositories 312 may be provided. The repository 312 may include one or more memories configured to store device-based policies and user-based policies, but the disclosure is not limited thereto. For example, the repository 312 may include one or more memories configured to store information including: rules, programs, requirements, configurable threshold values defined by a product team to validate against service level objective (SLO), machine learning models, log data, hash values, etc., but the disclosure is not limited thereto. According to exemplary embodiments, the DNCIM 306 may be configured to be storage platform agnostic—configured to be deployed across multiple storage layers.

According to exemplary embodiments, the DNCIM 306 may be configured to receive continuous feed of data from the repository 312 via the communication network 310.

As will be described below, the DNCIM 306 may be configured to: implement a chaos controller DNS server; configure a client application running on the client system to utilize the chaos controller DNS server as a DNS server; select the chaos controller DNS as the DNS server; provide a controller application programming interface (API) and a chaos controller central server; and orchestrate a type and a duration of a network chaos injection by utilizing the chaos controller application programming interface (API) and the chaos controller central server without modifying an application code of the client application, but the disclosure is not limited thereto.

The plurality of client devices 308(1)-308(n) are illustrated as being in communication with the DNCID 302. In this regard, the plurality of client devices 308(1)-308(n) may be "clients" of the DNCID 302 and are described herein as such. Nevertheless, it is to be known and understood that the plurality of client devices 308(1)-308(n) need not necessarily be "clients" of the DNCID 302, or any entity described in association therewith herein. Any additional or alternative relationship may exist between either or more of the plurality of client devices 308(1)-308(n) and the DNCID 302, or no relationship may exist.

One of the plurality of client devices 308(1)-308(n) may be, for example, a computer, a laptop, or a mobile device, but the disclosure is not limited thereto. Of course, the plurality of client devices 308(1)-308(n) may be any additional device described herein, e.g., a laptop, a computer, or a mobile device, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the DNCID 302 via broadband or cellular communication. Of course, these embodiments are merely exemplary and are not limiting or exhaustive.

Figure 4:
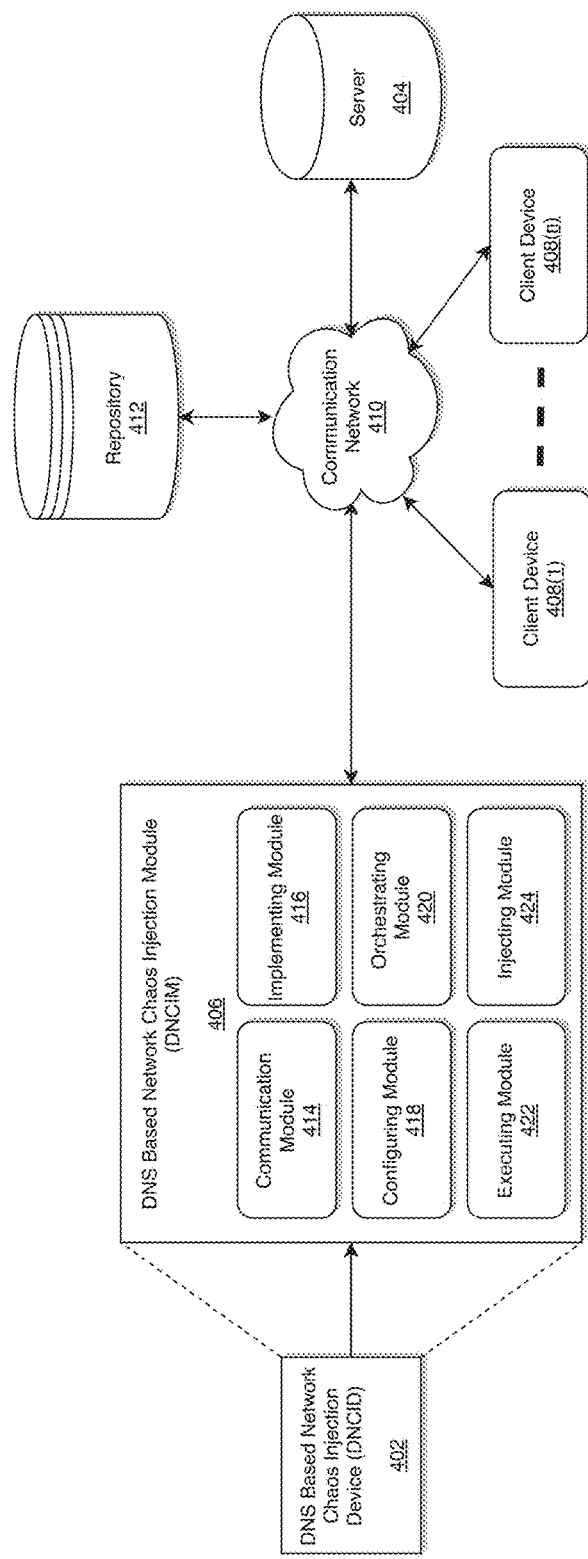
FIG. 4 illustrates a system diagram for implementing a chaos injection module of FIG. 3 in accordance with an exemplary embodiment.

FIG. 4 illustrates a system diagram having a DNCIM of FIG. 3 in accordance with an exemplary embodiment.

As illustrated in FIG. 4, the system 400 may include a DNCID 402 within which a DNCIM 406 may be embedded, a repository 412, a server 404, client devices 408(1)-408(n), and a communication network 410. According to exemplary embodiments, the DNCID 402, DNCIM 406, repository 412, the server 404, the client devices 408(1)-408(n), and the communication network 410 as illustrated in FIG. 4 may be the same or similar to the DNCID 302, the DNCIM 306, the repository 312, the server 304, the client devices 308(1)-308(n), and the communication network 310, respectively, as illustrated in FIG. 3.

According to exemplary embodiments, the repository 312, 412 may be a cloud-based repository that supports user authentication, repository security, and integration with existing databases and developments, but the disclosure is not limited thereto.

As illustrated in FIG. 4, the DNCIM 406 may include a communication module 414, an implementing module 416, a configuring module 418, an orchestrating module 420, an executing module 422, and an injecting module 424. According to exemplary embodiments, the repository 412 may be external to the DNCID 402 may include various systems that are managed and operated by an organization. Alternatively, according to exemplary embodiments, the repository 412 may be embedded within the DNCID 402 and/or the DNCIM 406.

The process may be executed via the communication module 414 and the communication network 410 which may comprise plural networks as described above. For example, in an exemplary embodiment, the various components of the DNCIM 406 may communicate with the server 404, and the repository 412 via the communication module 428 and the communication network 410. Of course, these embodiments are merely exemplary and are not limiting or exhaustive.

According to exemplary embodiments, the communication network 410 and the communication module 414 may be configured to establish a link between the repository 412, the client devices 408(1)-408(n) and the DNCIM 406.

According to exemplary embodiments, each of the communication module 414, implementing module 416, configuring module 418, orchestrating module 420, executing module 422, and the injecting module 424 may be implemented by microprocessors or similar, they may be programmed using software (e.g., microcode) to perform various functions discussed herein and may optionally be driven by firmware and/or software. Alternatively, each of the communication module 414, implementing module 416, configuring module 418, orchestrating module 420, executing module 422, and the injecting module 424 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, implementing module 416, configuring module 418, orchestrating module 420, executing module 422, and the injecting module 424 may be physically separated into two or more interacting and discrete blocks, units, devices, and/or modules without departing from the scope of the inventive concepts.

According to exemplary embodiments, each of the communication module 414, implementing module 416, configuring module 418, orchestrating module 420, executing module 422, and the injecting module 424 of the DNICM 406 may be invoked by corresponding API, but the disclosure is not limited thereto.

Figure 5:
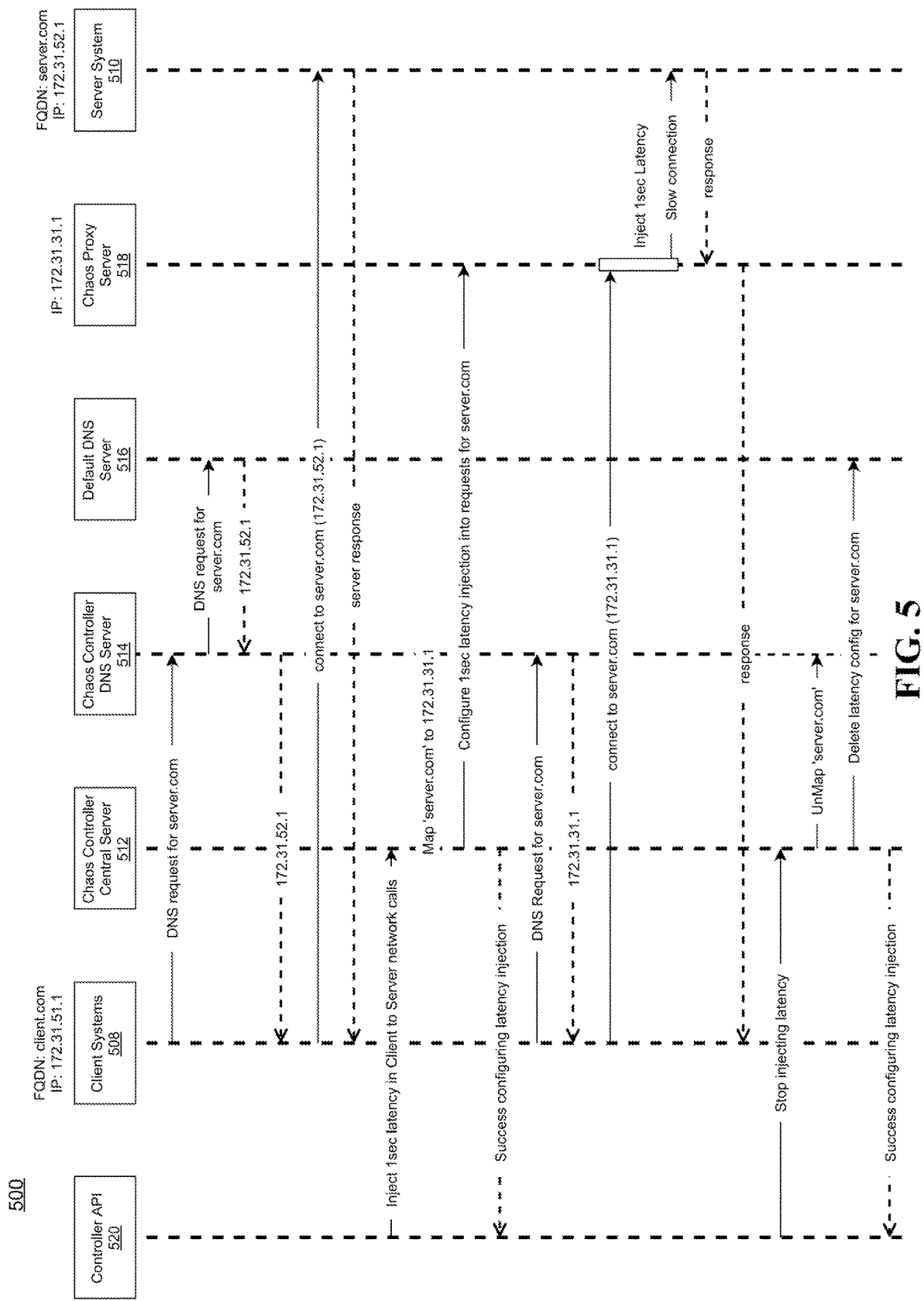
FIG. 5 illustrates a flow diagram for chaos injection utilizing the chaos injection module of FIG. 4 in accordance with an exemplary embodiment.

FIG. 5 illustrates a flow diagram 500 for chaos injection utilizing the DNCIM 406 of FIG. 4 in accordance with an exemplary embodiment. It will be appreciated that the illustrated process 500 and associated steps may be performed in a different order, with illustrated steps omitted, with additional steps added, or with a combination of reordered, combined, omitted, or additional steps.

According to exemplary embodiments, the flow diagram 500 may include a client system 508, a server system 510, a chaos controller server 512, a chaos controller DNS server 514, a default DNS server 516 (i.e., default server), a chaos proxy server 518, and a controller API 520 (e.g., chaos controller API).

Referring to FIGS. 4 and 5, according to exemplary embodiments, the implementing module 416 may be configured to implement a chaos controller DNS server 512 and the configuring module 418 may a configure a client application running on the client system 508 to utilize the chaos controller DNS server 514 as a DNS server. The DNCIM 406 may select the chaos controller DNS server 514 as the DNS server.

According to exemplary embodiments, the implementing module 416 may implement a controller API 520 (e.g., chaos controller API) and a chaos controller central server 512 and the orchestrating module 420 may orchestrate a type and a duration of a network chaos injection by utilizing the chaos controller API 520 and the chaos controller central server 512 without modifying an application code of the client application.

According to exemplary embodiments, the chaos controller DNS server 514 may be configured to change DNS response based on a command from the chaos controller central server 512, but the disclosure is not limited thereto.

According to exemplary embodiments, the implementing module 416 may implement a chaos proxy server 518 which is a network proxy where the network chaos injection happens.

According to exemplary embodiments, the chaos controller DNS server 514 may be configured to operate in a normal operation mode and a chaos injection mode different from the normal operation mode, but the disclosure is not limited thereto.

According to exemplary embodiments, during the normal operation mode when the client system 508 needs to communicate with a target server (i.e., server system 510), the executing module 422 of the DNCIM 406 may execute the chaos controller DNS server 514. During the normal operation mode, the chaos controller DNS server 514 may be configured to: implement a default DNS server 516 from within the network 410 to return an internet protocol (IP) address of the target server (i.e., server system 510) and establish a direct connection between the client system 508 and the target server (i.e., server system 510) without any network interception.

According to exemplary embodiments, during the chaos injection mode when the client system 508 needs to communicate with a target server (i.e., server system 510), the DNCIM 406 may coordinate the chaos controller API 520 and the chaos controller central server 512 to execute the chaos controller DNS server 514 to operate in the chaos injection mode. During the chaos injection mode, the chaos controller DNS server 514 may be configured to: return an IP address of an intercepting chaos proxy server 518 instead of an IP address of the target server (i.e., server system 510); and establish a direct connection between the client system 508 and the intercepting chaos proxy server 518; and inject, by utilizing the injecting module 424, network failures of various types via the intercepting chaos proxy server 518.

Figure 6:
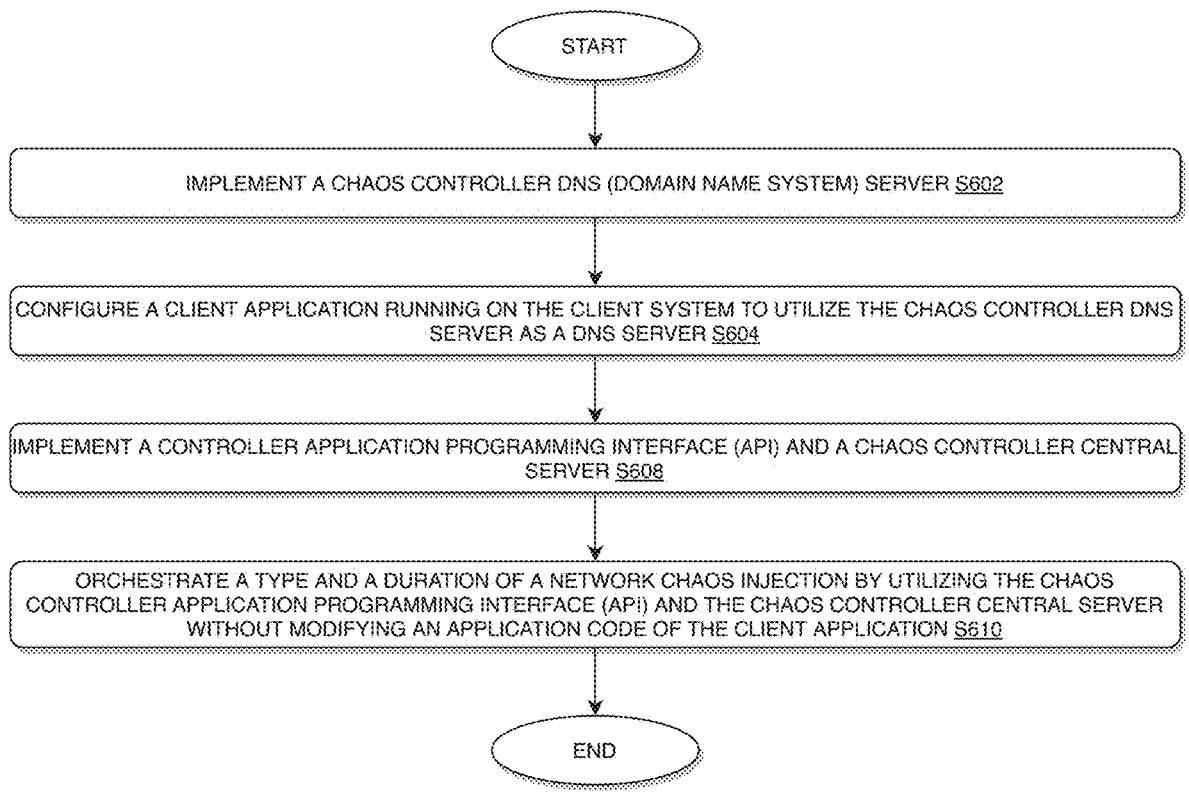
FIG. 6 illustrates a flow chart of a process for implementing a DNS-based network chaos injection module in accordance with an exemplary embodiment.

FIG. 6 illustrates a flow chart of a process 600 for implementing a DNS-based network chaos injection module in accordance with an exemplary embodiment. It will be appreciated that the illustrated process 600 and associated steps may be performed in a different order, with illustrated steps omitted, with additional steps added, or with a combination of reordered, combined, omitted, or additional steps.

At step S602, the process 600 may include implementing a chaos controller DNS (Domain Name System) server. At step S604, the process 600 may include configuring a client application running on the client system to utilize the chaos controller DNS server as a DNS server. At step S608, the process 600 may include implementing a controller API (e.g., chaos controller API) and a chaos controller central server. At step S610, the process 600 may include orchestrating a type and a duration of a network chaos injection by utilizing the chaos controller application programming interface (API) and the chaos controller central server without modifying an application code of the client application.

According to exemplary embodiments, the process 600 may further include other functionalities as disclosed herein with respect to FIGS. 1-5.

For example, according to exemplary embodiments, during the normal operation mode when the client system needs to communicate with a target server, the process 600 may further include: executing the chaos controller DNS server, wherein during the normal operation mode, the chaos controller DNS server may be configured to: implement a default DNS server from within the network to return an internet protocol (IP) address of the target server; and establish a direct connection between the client system and the target server without any network interception.

According to exemplary embodiments, during the chaos injection mode when the client system needs to communicate with a target server, the process 600 may further include: coordinating the chaos controller API and the chaos controller central server to execute the chaos controller DNS server to operate in the chaos injection mode, wherein during the chaos injection mode, the chaos controller DNS server is configured to: return an IP address of an intercepting chaos proxy server instead of an IP address of the target server; and establish a direct connection between the client system and the intercepting chaos proxy server; and inject network failures of various types via the intercepting chaos proxy server.

Referring to FIGS. 4-5, according to exemplary embodiments, the DNCID 402 may include a memory (e.g., a memory 106 as illustrated in FIG. 1) which may be a non-transitory computer readable medium that may be configured to store instructions for implementing DNCIM 406 for injecting network chaos between a client system 508 and a server system 510 within a network 410. The computing device DNCID 402 may also include a medium reader (e.g., a medium reader 112 as illustrated in FIG. 1) which may be configured to read any one or more sets of instructions, e.g., software, from any of the memories described herein. The instructions, when executed by a processor (e.g., a processor 104 as illustrated in FIG. 1) embedded within the DNCIM 406 or within the DNCID 402, may be used to perform one or more of the methods and processes as described herein. In a particular embodiment, the instructions may reside completely, or at least partially, within the memory 106, the medium reader 112, and/or the processor 104 (see FIG. 1) during execution by the DNCID 402.

For example, the instructions, when executed, may cause the processor 104 to perform the following: implementing a chaos controller DNS server; configuring a client application running on the client system to utilize the chaos controller DNS server as a DNS server; selecting the chaos controller DNS as the DNS server; implementing a controller API (e.g., chaos controller API) and a chaos controller central server; and orchestrating a type and a duration of a network chaos injection by utilizing the chaos controller API and the chaos controller central server without modifying an application code of the client application.

According to exemplary embodiments, the instructions, when executed, may further cause the processor 104 to perform the following: implementing a chaos proxy which is a network proxy where the network chaos injection happens.

According to exemplary embodiments, during the normal operation mode when the client system needs to communicate with a target server, the instructions, when executed, may further cause the processor 104 to perform the following: executing the chaos controller DNS server, and wherein during the normal operation mode, the chaos controller DNS server may be configured to: implement a default DNS server from within the network to return an internet protocol (IP) address of the target server; and establish a direct connection between the client system and the target server without any network interception.

According to exemplary embodiments, during the chaos injection mode when the client system needs to communicate with a target server, the instructions, when executed, may further cause the processor 104 to perform the following: coordinating the chaos controller API and the chaos controller central server to execute the chaos controller DNS server to operate in the chaos injection mode, and wherein during the chaos injection mode, the chaos controller DNS server is configured to: return an IP address of an intercepting chaos proxy server instead of an IP address of the target server; and establish a direct connection between the client system and the intercepting chaos proxy server; and inject network failures of various types via the intercepting chaos proxy server.

Thus, the exemplary embodiments disclosed herein with reference to FIGS. 1-6 may provide platforms for implementing a DNS-based network chaos injection module that utilizes DNS to intercept network requests and inject failures, thereby obviating the necessity to modify application code or special privileges on a host operating system, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for injecting network chaos between a client system and a server system within a network by utilizing one or more processors and one or more memories, the method comprising:
   implementing a chaos controller DNS (Domain Name System) server;
   configuring a client application running on the client system to utilize the chaos controller DNS server as a DNS server;
   selecting the chaos controller DNS as the DNS server;
   implementing a chaos controller application programming interface (API) and a chaos controller central server; and
   orchestrating a type and a duration of a network chaos injection by utilizing the chaos controller API and the chaos controller central server without modifying an application code of the client application,
   wherein the chaos controller DNS server is configured to operate in a normal operation mode and a chaos injection mode different from the normal operation mode, and
   wherein during the normal operation mode when the client system needs to communicate with a target server, the method further comprising:
   executing the chaos controller DNS server, wherein during the normal operation mode, the chaos controller DNS server is configured to:
   implement a default DNS server from within the network to return an internet protocol (IP) address of the target server; and
   establish a direct connection between the client system and the target server without any network interception.

2. The method according to claim 1, wherein the chaos controller DNS server is configured to change DNS response based on a command from the chaos controller central server.

3. The method according to claim 1, further comprising:
   implementing a chaos proxy which is a network proxy where the network chaos injection happens.

4. The method according to claim 1, wherein during the chaos injection mode when the client system needs to communicate with a target server, the method further comprising:
   coordinating the chaos controller API and the chaos controller central server to execute the chaos controller DNS server to operate in the chaos injection mode.

5. The method according to claim 4, wherein during the chaos injection mode, the chaos controller DNS server is configured to:
   return an IP address of an intercepting chaos proxy server instead of an IP address of the target server; and
   establish a direct connection between the client system and the intercepting chaos proxy server; and
   inject network failures of various types via the intercepting chaos proxy server.

6. A system for injecting network chaos between a client system and a server system within a network, the system comprising:
   a processor and one or more memories operatively connected to the processor via the network, wherein the processor is configured to:
   implement a chaos controller DNS (Domain Name System) server;
   configure a client application running on the client system to utilize the chaos controller DNS server as a DNS server;
   select the chaos controller DNS as the DNS server;
   provide a chaos controller application programming interface (API) and a chaos controller central server; and
   orchestrate a type and a duration of a network chaos injection by utilizing the chaos controller API and the chaos controller central server without modifying an application code of the client application,
   wherein the chaos controller DNS server is configured to operate in a normal operation mode and a chaos injection mode different from the normal operation mode, and
   wherein during the normal operation mode when the client system needs to communicate with a target server, the processor is further configured to:
   execute the chaos controller DNS server, wherein during the normal operation mode, the chaos controller DNS server is configured to:
   implement a default DNS server from within the network to return an internet protocol (IP) address of the target server; and
   establish a direct connection between the client system and the target server without any network interception.

7. The system according to claim 6, wherein the chaos controller DNS server is configured to change DNS response based on a command from the chaos controller central server.

8. The system according to claim 6, wherein the processor is further configured to:
implement a chaos proxy which is a network proxy where the network chaos injection happens.

9. The system according to claim 6, wherein during the chaos injection mode when the client system needs to communicate with a target server, the processor is further configured to:
coordinate the chaos controller API and the chaos controller central server to execute the chaos controller DNS server to operate in the chaos injection mode.

10. The system according to claim 9, wherein during the chaos injection mode, the chaos controller DNS server is configured to:
return an IP address of an intercepting chaos proxy server instead of an IP address of the target server; and
establish a direct connection between the client system and the intercepting chaos proxy server; and
inject network failures of various types via the intercepting chaos proxy server.

11. A non-transitory computer readable medium configured to store instructions for injecting network chaos between a client system and a server system within a network, wherein, when executed, the instructions cause a processor to perform the following:
implementing a chaos controller DNS (Domain Name System) server;
configuring a client application running on the client system to utilize the chaos controller DNS server as a DNS server;
selecting the chaos controller DNS as the DNS server;
implementing a chaos controller application programming interface (API) and a chaos controller central server; and
orchestrating a type and a duration of a network chaos injection by utilizing the chaos controller API and the chaos controller central server without modifying an application code of the client application,
wherein the chaos controller DNS server is configured to operate in a normal operation mode and a chaos injection mode different from the normal operation mode, and
wherein during the normal operation mode when the client system needs to communicate with a target server, the instructions, when executed, further cause the processor to perform the following:
executing the chaos controller DNS server, wherein during the normal operation mode, the chaos controller DNS server is configured to:
implement a default DNS server from within the network to return an internet protocol (IP) address of the target server; and
establish a direct connection between the client system and the target server without any network interception.

12. The computer-readable storage medium according to claim 11, wherein the chaos controller DNS server is configured to change DNS response based on a command from the chaos controller central server.

13. The computer-readable storage medium according to claim 11, wherein the instructions, when executed, further cause the processor to perform the following:
implementing a chaos proxy which is a network proxy where the network chaos injection happens.

14. The computer-readable storage medium according to claim 11, wherein during the chaos injection mode when the client system needs to communicate with a target server, the instructions, when executed, further cause the processor to perform the following:
coordinating the chaos controller API and the chaos controller central server to execute the chaos controller DNS server to operate in the chaos injection mode, wherein during the chaos injection mode, the chaos controller DNS server is configured to:
return an IP address of an intercepting chaos proxy server instead of an IP address of the target server; and
establish a direct connection between the client system and the intercepting chaos proxy server; and
inject network failures of various types via the intercepting chaos proxy server.

* * * * *